United States Patent [19]

Shichida et al.

[11] 4,050,837
[45] Sept. 27, 1977

[54] DRILLING MACHINE WITH AUTOMATIC TOOL CHANGER

[75] Inventors: Hiromichi Shichida, Hino; Hideo Katsube; Shigeaki Oyama, both of Hachioji; Kenichi Toyoda, Hino; Mitsuo Saito, Tokyo, all of Japan

[73] Assignee: Fujitsu Fanuc Limited, Hino, Japan

[21] Appl. No.: 703,368

[22] Filed: July 8, 1976

[30] Foreign Application Priority Data

July 15, 1975    Japan ................................ 50-85865

[51] Int. Cl.² ............................................ B23B 39/20
[52] U.S. Cl. .......................................... 408/35; 29/40
[58] Field of Search ..................... 408/35; 29/39, 40

[56] References Cited

U.S. PATENT DOCUMENTS

| | | | |
|---|---|---|---|
| 2,991,666 | 7/1961 | Charlt | 408/35 |
| 3,406,607 | 10/1968 | Hill | 408/35 |
| 3,473,419 | 10/1969 | Ollearo | 408/35 |
| 3,564,943 | 2/1971 | Kavanagh | 408/35 |
| 3,691,899 | 9/1972 | Antonietto | 408/35 |

*Primary Examiner*—Gil Weidenfeld
*Attorney, Agent, or Firm*—Staas & Halsey

[57] ABSTRACT

A drilling machine with an automatic tool changer (A.T.C.) comprising a driving motor for a spindle head and a tool magazine rotatably supported by the spindle head and provided with a plurality of tool arbors for holding tools, one of the tools being interchanged with another of the tools by intermittent rotation of the tool magazine, and wherein the tool arbors are supported for swinging movement between a protrusion position and a retraction position so as not to obstruct the machining operation.

7 Claims, 5 Drawing Figures

DRILLING MACHINE WITH AUTOMATIC TOOL CHANGER

BACKGROUND OF THE INVENTION

1. Field of the Invention

The present invention relates generally to a drilling machine, and more particularly to a drilling machine which has a number of tools therein. Said drilling machine automatically selects a desired tool and functions like a so-called drilling machine with an automatic tool changer (A.T.C.).

2. Description of the Prior Art

A drilling machine with an automatic tool changer is basically comprised of: a table which is slidably located on a bed and moves a workpiece to any desired position in a horizontal plane; a tool for machining said workpiece; a spindle, to which said tool is detachably connected, which rotates together with said tool; a spindle head by which said spindle is rotatably held; a spindle driving motor for rotating said spindle; a lead or feed screw for moving said spindle head up and down, and; a driving motor for rotating said lead screw. In the above described drilling machine with an automatic tool changer, said tool is one of a predetermined number of tools. These tools are rotatably held by a circular tool magazine and are arranged at a constant pitch along the periphery thereof. Furthermore, said circular tool magazine is rotatable with respect to the spindle head in an intermittent motion. Each of the tools comes under the spindle when the circular tool magazine rotates in an intermittent motion. When one of the tools is needed for a machining operation, for example, drilling, the spindle head is traversed upward by the driving motor, together with the spindle and also with the spindle driving motor, by means of the lead screw. Then, the tool magazine can freely rotate without running against the spindle. Subsequently, the desired tool comes under the spindle and the axis of the desired tool is aligned with the axis of the spindle. After this, the spindle head is traversed downward, thereby connecting the spindle with the desired tool.

In a drilling machine with an automatic tool changer according to the prior art, non-working tools, in particular non-working tools adjacent to a working tool may interfere with a workpiece during a machining operation since the non-working tools protrude outwardly and downwardly. That is, when the working tool is moving downward together with the tool magazine to machine a workpiece, for example, to drill a workpiece, the non-working tools adjacent to the working tool come into contact with the workpiece and obstruct the machining work. Furthermore, a similar problem occurs in the case of different kinds of tools arranged in the tool magazine. That is, for example in the case of a working tool being shorter than the non-working tools adjacent to it, there is the possibility that the non-working tools will come into contact with the workpiece prior to the working tool and obstruct the contact of the working tool with the workpiece, so that the desired machining becomes impossible to carry out. To solve this problem, it is necessary to enlarge the circular tool magazine, i.e. to increase the radius of the circular tool magazine in which a plurality of tools are arranged at a constant pitch along the periphery thereof, resulting in a large sized apparatus.

SUMMARY OF THE INVENTION

Therefore, it is the principal object of the present invention to provide a drilling machine with an automatic tool changer comprising tool arbors which can swing between a working or protrusion position in which a working tool or desired tool is aligned with the spindle and faces a workpiece and non-working or retraction positions in which non-working tools are retracted so as not to interfere with the workpiece.

Another object of this invention is to provide a rotatable magazine supporting a plurality of swingably mounted tool arbors thereon together with cam mechanism associated therewith to positively position each tool arbor in a desired position as the magazine is rotated.

A further object is to provide a cam structure having a deep recessed portion for actuating associated tool arbors in a positive manner as they are moved past the cam structure.

The present invention will be more apparent from the ensuing description with reference to the accompanying drawings wherein:

DESCRIPTION OF THE PREFERRED EMBODIMENT

Figure 1:
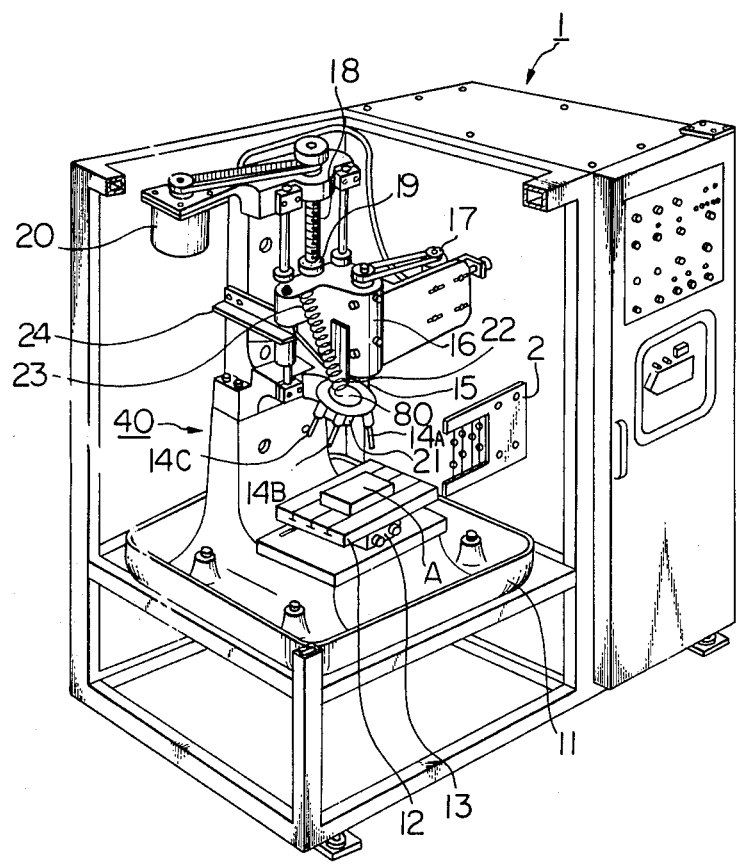
FIG. 1 is a perspective view, partially cut away, showing a drilling machine with an automatic tool changer according to the present invention.

FIG. 1 is a perspective view, partially cut away, showing a drilling machine with an automatic tool changer of the present invention, contained in a numerically controlled machine tool. In FIG. 1, a drilling machine with an automatic tool changer is generally indicated at 1. The drilling machine 1 is basically comprised of:
a bed 11;
a table 12 on which a workpiece A can be fixed, for example, with the help of a magnetic force and which moves to any desired position along a horizontal plane, for example, by means of a surface electric pulse motor 13;
a tool 14 for machining the workpiece which is arranged in such a way that it is in a vertical position and faces the workpiece in its working position;
a spindle 15 to which the tool 14 can be connected and which rotates together with said tool;
a spindle head 16 by which the spindle 15 is rotatably held;
a spindle driving motor 17 which is mounted on the spindle head 16 and rotates the spindle 15;
a lead or feed screw 18 which is fixed to the bed 11, is located near the spindle head 16 and extends parallel to the axis of the spindle 15;

a ball nut 19 which is provided in the spindle head 16 and engages with the lead screw 18;

a driving motor 20 which rotates the lead screw 18 and vertically moves the spindle head 16, together with the spindle 15 and also the spindle driving motor 17, by means of the ball nut 19. In the above described drilling machine 1, said tool 14 is one of a predetermined number of tools 14A, 14B, 14C, . . . (seven tools being provided in the present invention). These tools are rotatably held by a tool magazine 21 and are arranged with a constant pitch along the periphery of the tool magazine 21. The tool magazine 21 is rotatably held by a bar 22 on its one end. The other end of the bar 22 is slidably supported by the spindle head 16. The axis of the bar 22 is inclined with respect to the axis of the spindle 15, as can be seen from FIG. 3. The bar 22 is supported by a coil spring 23 at its one end. The other end of said bar 22 is fixed to a slidable frame 122. Thus, the tool magazine 21 is always biased upwardly by means of the coil spring 23. By the help of this upward pulling force, the desired one of the tools (14A, 14B, 14C . . . ) after it comes under the spindle 15, is firmly connected to the spindle 15 by means of a tapered shank coupling 62 (FIG. 3) on the tool arbor. When one of the tools (14A, 14B, 14C . . . ) is desired for drilling, the driving motor 20 is driven so as to rotate and the spindle head 16 is traversed upwardly through the lead screw 18 and the ball nut 19. At the same time the tool magazine 21 is traversed upwardly by means of the coil spring 23 and, finally, the tool magazine 21 support bar frame projection 51 abuts against a stop 24. At this point the tool magazine 21 stops traversing in the upward direction, however, the spindle head 16 continues to traverse upwardly because of slidable frame structures 122 and 116. Therefore, said tapered shank coupling 62 is released and the spindle 15 moves vertically relatively far away from the tool magazine 21. The spindle head 16 stops traversing upwardly when it meets with an upper limit switch (not shown). The upper limit switch is fixed to a frame (not shown) at a predetermined distance from the table 12. The predetermined distance regarding the upper limit switch and also other predetermined distances regarding other limit switches (not shown), or spindle travels, are freely set previously using a limit switch preset unit 2. Since the spindle 15 moves relatively far away from the tool magazine 21, the tool magazine 21 and the tools and arbors thereon may freely rotate without running against the spindle 15.

As mentioned above, according to the prior art when a desired tool moves downward to machine the workpiece, other tools in non-working positions, particularly non-working tools adjacent to the working tool may interfere with the workpiece, since they normally protrude downwardly and outwardly in their non-working positions. The non-working positions of the tools according to the prior art are shown by a dotted-dashed line in FIG. 3.

Figure 3:
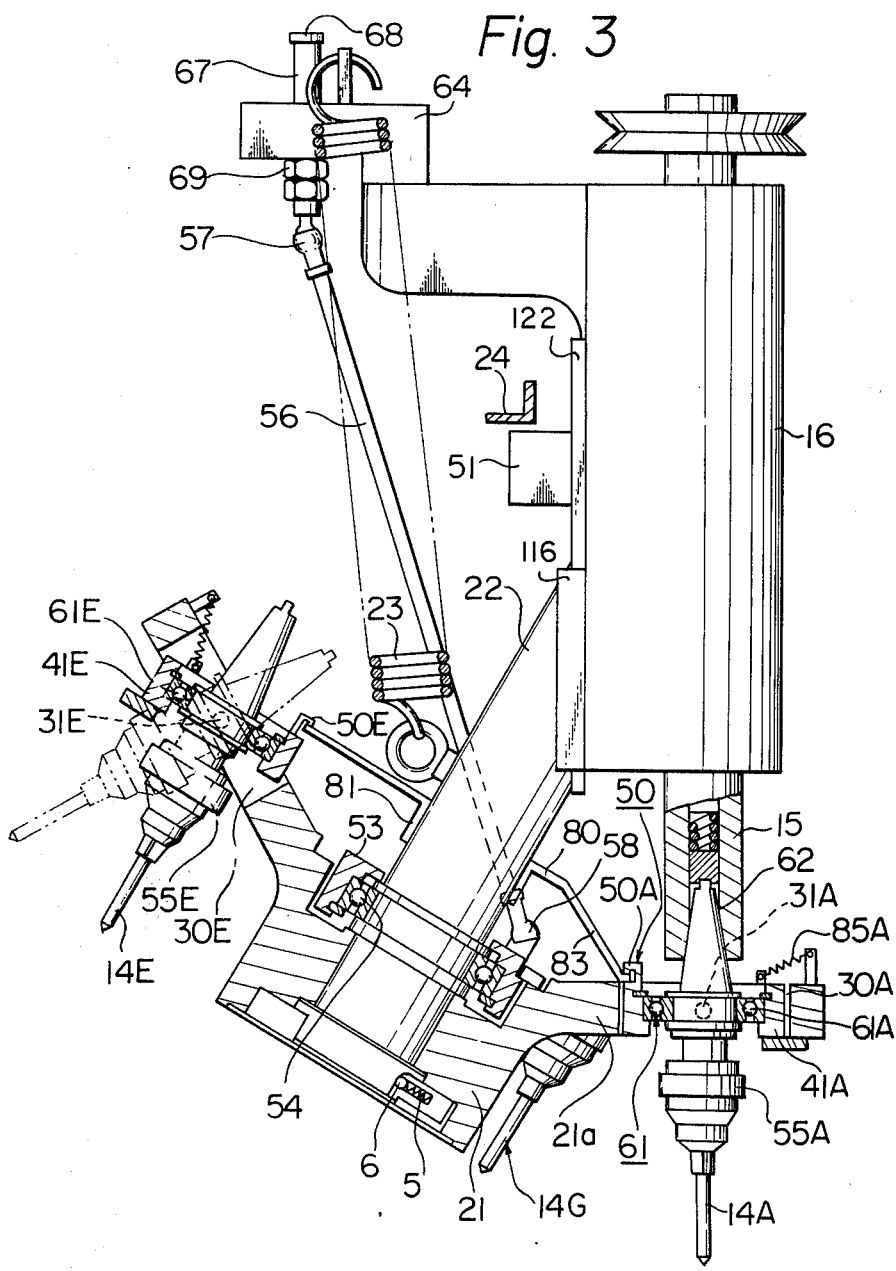
FIG. 3 is a schematic and sectional front view of the drilling machine with an automatic tool changer according to the present invention.

In order to solve this problem, according to the present invention, tool arbors with tools therein can swing between a working or protrusion position, in which a working or desired tool is aligned with the spindle and faces the workpiece, and a non-working or retraction position, in which non-working tools are retracted so as not to interfere with the workpiece. Tool 14A in FIG. 3 is shown in the working position while tool 14E in solid lines is in the retracted position.

Figure 4:
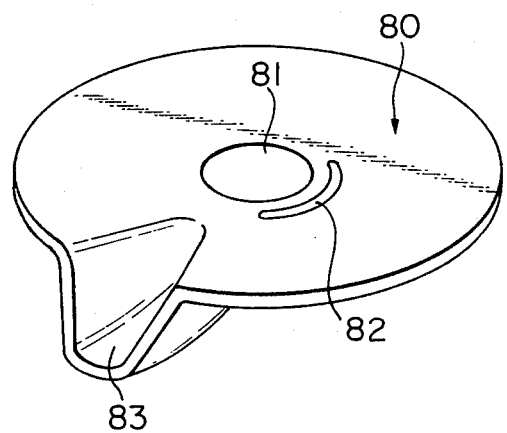
FIG. 4 is a perspective view of the cam plate provided in the drilling machine according to the present invention.
Figure 5:
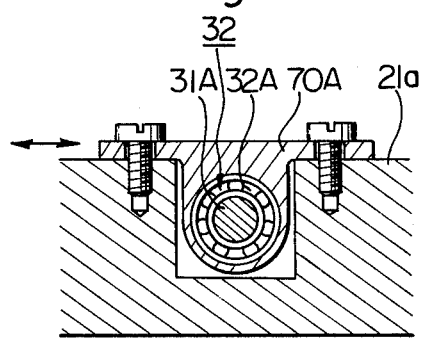
FIG. 5 is a sectional view taken along the line V—V in FIG. 2.

Now referring to FIGS. 1 to 5, the tool magazine 21 is shown formed with a flange portion 21a (FIGS. 2 and 3) on which a number of openings 30 (30A, 30B, 30C, . . . ) corresponding to the number of tools 14 (14A, 14B, 14C, . . . ) are formed. In each of these openings, a support ring 41 (41A, 41B, 41C, . . . ) is swingably mouned which rotatably supports the corresponding tool arbor 55 (55A, 55B, 55C, . . . ) about the spindle axis with the help of bearing 61 (61A, 61B, 61C, . . . ). The support rings 41 and the arbors 55 can swing about their support shafts 31 (31A, 31B, 31C, . . . ) which are rotatably supported by means of bearings 32 (32A, 32B, 32C, . . . ) in brackets 70 (70A, 70B, 70C, . . . ) fixed to the flange portion 21a of the tool magazine 21, as shown in FIG. 5. The support rings 41 are forced into the beforementioned working position by tension springs 85 (85A, 85B, 85C, . . . ). Each of the support rings 41 is provided with an abutment 50 (50A, 50B, 50C, . . . ) in the form of a generally reversed L (FIG. 3) which always engages with the periphery of a cam plate 80 fixed to the bar 22. Abutment 50 (50A, 50B, 50C, . . . ) effects the movement of the rings 41 (41A, 41B, 41C, . . . ) and the tool arbors rotatably mounted therein serves as a cam follower.

Figure 2:
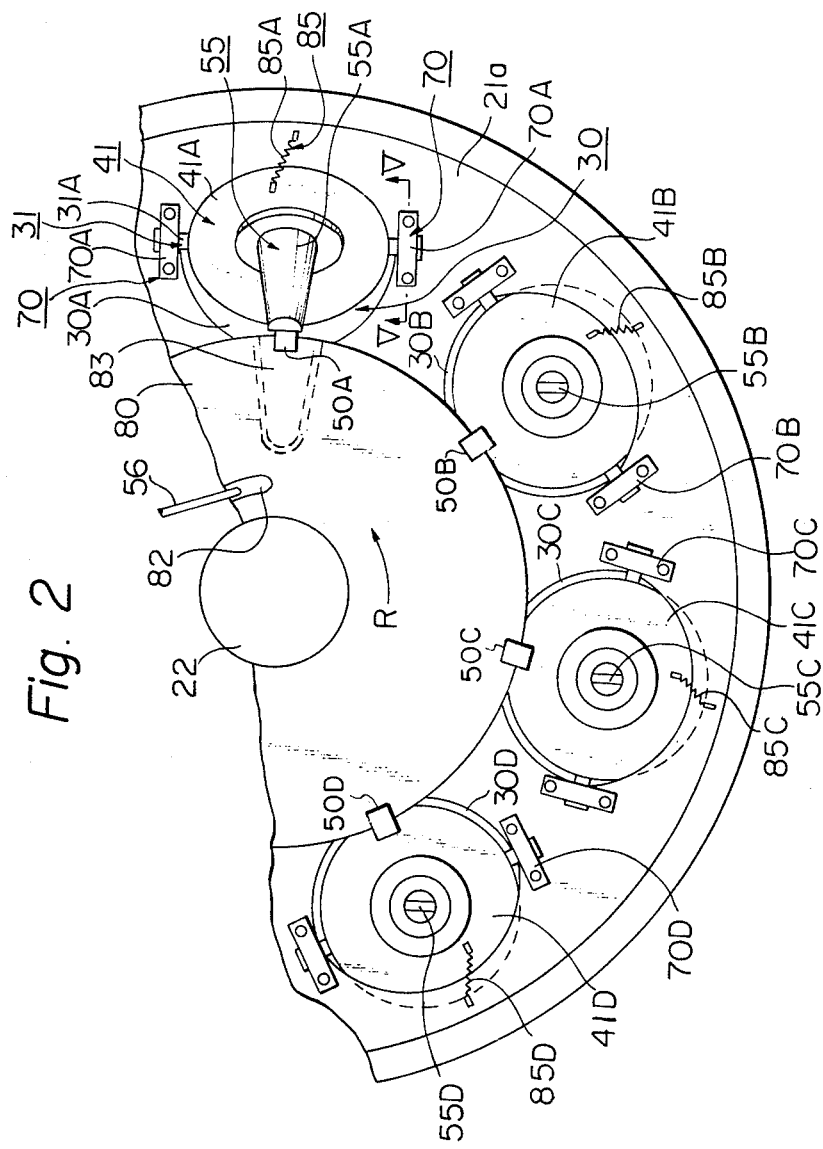
FIG. 2 is a schematic plan view of the tool magazine of the drilling machine with an automatic tool changer according to the present invention, seen from the axial direction of the tool magazine.

According to the invention, the cam plate 80 is, as shown in FIG. 4, provided with a center opening flange 81 in which the bar 22 (FIG. 3) is fitted, an elongated slot 82 through which a pull rod 56 (FIG. 3) extends, and a recess 83 formed on the periphery of the cam plate 80. The cam plate 80 is designed in such a way that one of the supporting rings 41 with cam follower abutment 50 rests on the lowermost surface of the recess 83 of the cam plate 80 when the tool 14 associated with the supporting ring is in its working position, that is to say, when the tool 14 is aligned with the spindle 15. At the same time the other supporting rings 41 with abutments rest on the flat surface of the cam plate 80 to bring the corresponding tools into their non-working positions. In FIGS. 2 and 3, only the tool 14A is in the working position and the other tools 14B, 14C, 14D, . . . are all in non-working positions as effected by the coin structure.

The pull rod 56 is, at its one end, connected through a universal joint 58 to a drive ring 53 which is fixed to the tool magazine 21 and which is rotatable about the bar 22 with the help of bearing 54. The other end of the pull rod 56 is connected through a universal joint 57 to a guide bar 67 provided with upper and lower stops 68 and 69. The guide bar 67 slidably extends through a nose 64 of the spindle head 16.

The tool magazine 21 can be intermittently rotated about the bar 22 by the upward displacement of the pull rod 56. The intermittent rotation of the tool magazine 21 is disclosed in detail in co-pending U.S. application Ser. No. 676,563, filed Apr. 13, 1976 by the same applicant. Applications corresponding to the U.S. application were also filed in the United Kingdom Application No. 14488/76, filing date, Apr. 9, 1976 and Sweden Pat. No. 7604464-3, filing date Apr. 15, 1976.

The intermittent rotation of the tool magazine is, therefore, briefly explained below. For the purpose of the explanation, it is assumed that the drilling operation using the tool 14A has finished and that the tool 14A is to be replaced by an another desired tool for completing the next drilling operation. At first, the spindle driving motor 17 (FIG. 1) stops rotating. Then both the spindle 15 and the tool 14A stop rotating. At the same time, the driving motor 20 (FIG. 1) starts rotating. The spindle head 16 then traverses upward. Finally, the stop 24 (FIGS. 1 and 3) abuts against member 51 (FIG. 3) fixed to plate 122 in turn fixed to the bar 22, and neither the bar 22 nor the tool magazine 21 can traverse further upwardly. However, since the end of the bar 22 fixed plate 122 is slidably supported by structure 116 on the spindle head 16, the spindle head can still traverse. In this process, an arbor 55A is pulled out and away from the spindle 15 and the nose 64 moves away from the lower stop 69 along the guide bar 67. The coil spring 23, which acts to connect the arbor 55 with the spindle 15, is now stretched quite far in this process and remains so stretched in the next process. Finally, the nose 64 abuts against the upper stop 68 while the spindle head 16 is still traversing upwardly. In this process, the nose 64 of the spindle head 16 pulls up on the stop 68 together with the guide bar 67 and the guide bar 67 in turn pulls up one end of the rod 56 via the universal joint 57. When the rod 56 is pulled up, the rod rotates the ratchet wheel (not shown) provided on the tool magazine via the universal joint 58 in the direction of the arrow R in FIG. 2, with respect to the bar 22. This results in the rotation of the tool magazine 21 in the same direction. Finally, both the ratchet wheel and the tool magazine 41 rotate 360/7° (in case of seven tools) and, thereby, the desired tool, for example tool 14B, for the next drilling operation comes under the spindle 15. At the same time, the driving motor 20 stops rotating. Then, the motor 20 rotates in a reverse direction and the spindle head 16 traverses downwardly. At first, the nose 64 of the spindle head 16 separates from the stop 68 and traverses downwardly to the stop 69 along the guide bar 67. Then, the spindle head 16 continues to traverse downwardly together with the stop 69, whereby the stop 69 pushes down the rod 56 via the universal joint 57. When the rod 56 is pushed down the rod rotates the ratchet wheel via the universal joint 58 with respect to the bar 22. In this process, a detent (not shown) slips on a side surface of the ratchet wheel without rotating the tool magazine 21. At this same time, the spindle 15 engages with the arbor 55. The spindle head 16 is still traversing downwardly and the spindle 15 is pushing down the tool magazine 21 through the arbor 55. Since the tool magazine 21 traverses downwardly together with the bar 22, the member 51 moves downward away from the stopper 24. The arbor 55 is still connected firmly to the spindle 15 by means of the coil spring 23 and a drilling operation using the tool 14B begins. The tool 14B is driven to rotate by the spindle driving motor 17 through the spindle 15.

When the tool magazine 21 is intermittently rotated, the support rings 41, and accordingly the tools 14, are brought into working position one at a time since the abutments 50 of the support rings 41 move on the cam plate 80 fixed to the bar 22. That is to say, the abutments 50 come into engagement with the lowermost surface of the recess 83 of the cam plate 80 one at a time in accordance with the intermittent rotation of the tool magazine 21. When, for example, an abutment 50A comes into engagement with the recess 83, the support ring 41A swings outward about the shaft 31A and occupies a working position in which the tool 14A is aligned with the axis of the spindle 15, since shown in FIG. 3. In other words, as all the non-working tools occupy retraction positions in which they are retracted inwardly with the help of the cam plate 80, one of the non-working tools in the retraction position being shown at 14E in FIG. 3, no non-working tool may interfere with the workpiece and obstruct the machining operation by a working tool.

The tool magazine 21 can be positively positioned in a desired position with the help of balls 6 biased by springs 5 provided in the tool magazine and engageable with corresponding recesses (not shown) formed in the bar 22.

In the present invention, it is not important how the tool magazine is intermittently rotated and, therefore, the tool magazine may be driven by various methods. For example, the tool magazine may be driven by a known type electric pulse motor arranged in the tool magazine in place of being driven by the rod 56.

The abutments 50 are always strongly pressed against the cam plate 80 due to the action of the springs 85.

According to the present invention, since a working tool only protrudes outwardly so as to face the workpiece, the drilling machine can be relatively small and, accordingly, light, without any interferences of the non-working tools with the workpiece.

It will be noted that the swing motion mechanism of the tools in the support rings can be also designed by appropriately modifying the shape of the cam plate in such a way that the tools swing not inwardly but outwardly when they change their position into the non-working positions from the working position to avoid any interferences of the non-working tools with the workpiece. However, with this alternate design, there is no advantage that the drilling machine can be relatively small and light.

What is claimed is:

1. A drilling machine with an automatic tool changer comprising longitudinally traversable spindle head including driving means therefore; a spindle rotatable held by said spindle head; a bar one end of which is slidably supported by said spindle head; a tool magazine which is intermittent-rotatably supported by the other end of said bar; a plurality of tool arbors for holding tools, rotatably held by said tool magazine, each of said tool arbors being detachable from said spindle and driven to rotate by said spindle; wherein the improvement comprises a cam plate fixed to said bar, and a plurality of support rings for rotatably supporting said tool arbors, each of said support rings being swingably attached to said magazine and having means engaging said cam plate and being supported for swing movement in the tool magazine between a working position in which the tool arbor is aligned with the axis of said spindle and a non-working position in which the tool arbor is retracted responsive to relative rotation between said magazine and said cam.

2. A drilling machine as set forth in claim 1, wherein said tool magazine comprises a plurality of openings in which said support rings are supported for swing movement and a plurality of springs which are connected to the support rings to bring the latter into the working position.

3. A drilling machine as set forth in claim 1, wherein said cam plate is provided with a recess, and each of said support rings is provided with an abutment which is always engaged and pressed on the cam plate, one of said tool arbors being in said working position only when the abutment of the support ring associated with that tool arbor is engaged with the recess of the cam plate, said tool arbors being brought into the working position one at a time in accordance with the intermittent rotation of the tool magazine.

4. A drilling machine as set forth in claim 2, wherein each of said support rings is pivotally mounted by a support shaft to permit said swing movement.

5. A drilling machine as set forth in claim 4, wherein each support shaft is supported by adjustable bearing means mounted on said magazine.

6. A drilling machine as set forth in claim 5, wherein said cam plate is provided with a recess, and each of said support rings is provided with an abutment which is engaged and pressed on said cam plate, one of said tool arbors being in said working position only when said abutment of said support ring associated with that tool arbor is engaged with the recess of said cam plate, said tool arbors being brought into said working position one at a time in accordance with intermittent rotation of said tool magazine.

7. A drilling machine as set forth in claim 6, wherein said recess is provided on the periphery of said cam plate and is designed in such a way that one of said support rings rest on the lowermost surface of said recess when said support ring is moved into the working position thereof.

* * * * *